United States Patent Office 3,334,726
Patented Aug. 8, 1967

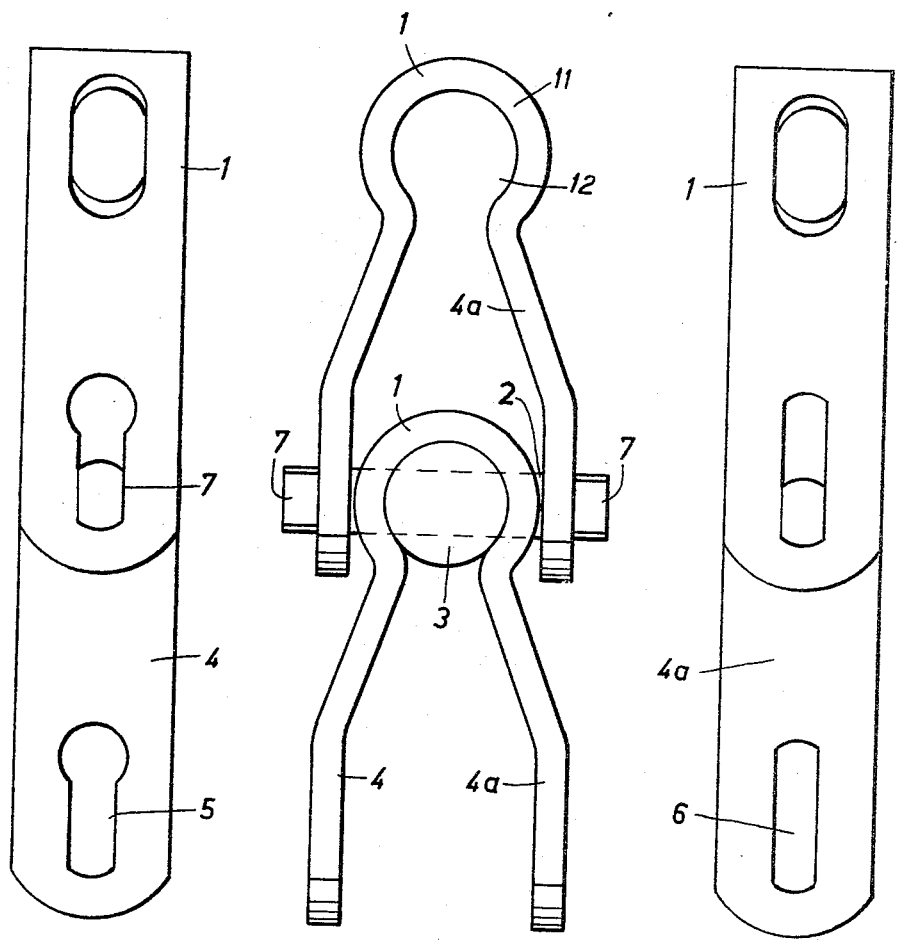

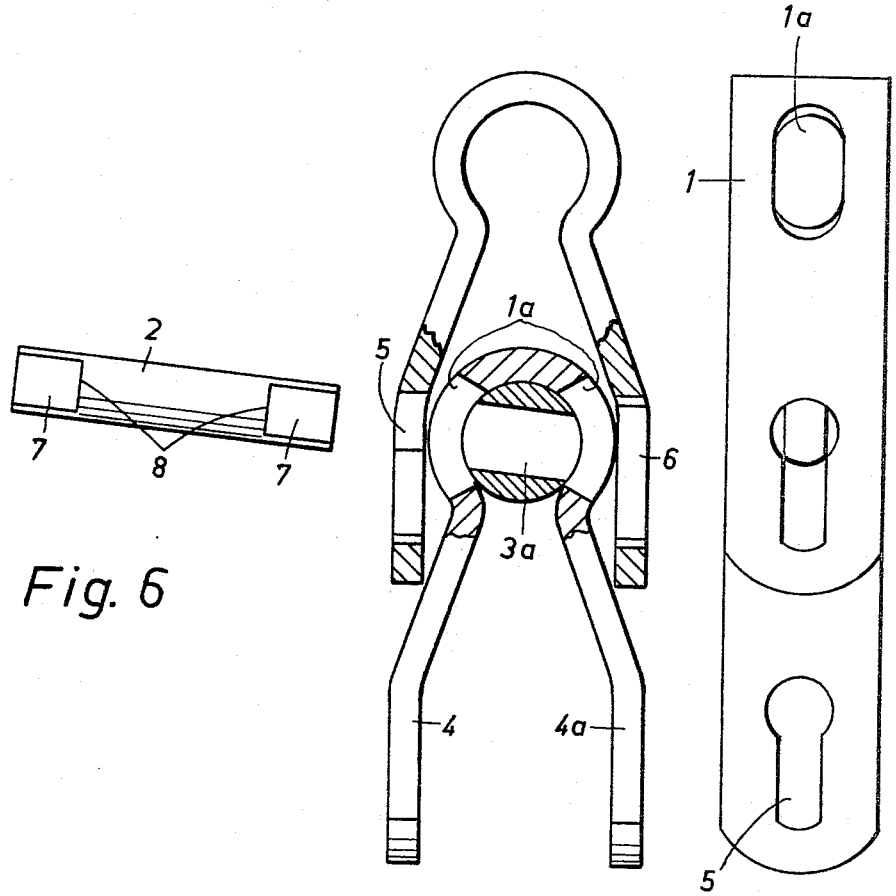

3,334,726
LINK CHAINS FOR CONVEYORS
Gustav Ivar Fredrikson, Vadstena, Sweden, assignor to Fredriksons Verkstads Aktiebolag, Vadstena, Sweden
Filed Mar. 3, 1966, Ser. No. 531,530
Claims priority, application Sweden, Apr. 9, 1965, 4,692/65
3 Claims. (Cl. 198—189)

ABSTRACT OF THE DISCLOSURE

The following is a disclosure of a sliding link chain particularly adapted for use as a driving chain in such assemblies as conveyors and the like. The chain is comprised of a plurality of successively arranged chain links each releasably connected to adjacent chain links by the cooperative relation of removable coupling bolts and journal members.

---

The invention relates to sliding link chains for conveyors, such as conveyors of the run-ring system or conveyors of the endless chain system.

From the United States Patent 2,753,982 to Gustav Ivar Fredrikson a link chain of the present type is known, in which the individual links consist of bow elements with circularly bent middle sections and are disposed so, that the ends of the legs of each bow link lie on respective sides of the bent middle section of the adjacent link and are pivotable around a coupling bolt, which is inserted through holes in the ends of the legs of each link and through holes in the middle section of the adjacent link, wherein the holes of the middle section are oblong in the longitudinal direction of the link for allowing a rotational movement of the links also on an axis at right angles to the coupling bolt, and wherein the middle section of each link is guided around a journal body having a transversal hole for the coupling bolt.

Link chains of this construction are characterized by a great flexibility in two planes at right angles to each other and therefore they can easily pass through horizontal and vertical curves at the same time as the running of the same is smooth. However, the coupling bolts are usually riveted to ensure that they will not slide out of their position, and on account of this the coupling bolts have to be cut off or sawn off when the chain has to be disjoined. This can be troublesome and time-consuming, especially when the chain is mounted within another structure, for instance disposed in a conveyor frame, in a quay, in a culvert or in other locations difficult of access.

The object of the invention is to create a link chain of the above-mentioned type and of such construction that the coupling bolts need not be riveted but can be inserted into and removed from the chain without working treatment by means of a tool, at the same time as any unintentional removal of the coupling bolts is prevented.

The characterizing features of the invention are as follows. The portion of the coupling bolt lying between the legs of each bow element is thicker than the end portions which are flattened and project through the holes made for the same in the legs. These holes are shaped as slots extending in the longitudinal direction of the link and having a width corresponding to the thickness of the flattened end portions of the coupling bolt. At least one of the slots is made with an enlargement at the end distant from the end of the leg, said enlargement being provided for allowing the thicker portion of the coupling bolt passing therethrough when the two links interconnected by the coupling bolt are shut together. The slot having the enlargement is of such length that when the links are shut together maximally, the coupling bolt will be located at least in part within the narrow portion of the slot and only by some movement into an oblique position under rotation of the journal body can be removed in an oblique direction through the enlargement.

One embodiment of the invention is by way of example illustrated diagrammatically in the accompanying drawings, in which:

FIG. 1 is a plan of a link chain section comprising two links;
FIG. 2 is a side view seen from the right in FIG. 1;
FIG. 3 is a side view seen from the left in FIG. 1;
FIG. 4 is a view corresponding to FIG. 3 but showing the links as pushed together;
FIG. 5 is a plan corresponding to FIG. 4, in part in a horizontal section, and removed coupling bolt;
FIG. 6 shows the removed coupling bolt in that oblique direction in which the same is removable and insertable with respect to FIG. 5;
FIG. 7 is a cross-section through the frame with the link chain, on a smaller scale.

In the drawings, the reference numeral 1 indicates the links, 2 is the coupling bolt or pin and 3 is the journal member or body. The links 1 are each comprised of a bent or bowed middle portion 11 and leg members 4 and 4a, said bowed portion 11 providing connecting means for retaining the leg members 4 and 4a of the links 1 in a plane in opposed spaced relation. The bowed portion 11 defines a journal housing illustrated as a bore 12 having an open side. One leg 4 of each link is provided with a slot 5 therethrough transversely of the longitudinal axis of the chain in the plane of the leg members 4 and 4a. The slot 5 is circularly enlarged at one end and thus has a keyhole shape, whereas the other leg 4a is provided with a transverse slot 6 in opposed relation to slot 5 having sides which are straight over the whole length. The coupling bolt 2 has an intermediate portion which is of circular cross-section and fits in the diametrically extending hole or bore 3a in the journal body 3, said round intermediate portion projecting through the oblong holes or apertures 1a in the bent middle section 11 of the link said holes 1a being disposed through said bent section 11 transversely of the longitudinal axis of the chain and in communication with the bore 12. The ends of the coupling bolt are shaped as plates 7 which fit in the straight portions of the slot 5, as well as in the slot 6. At the transition between the round intermediate portion and the plates 7 there are formed shoulders 8 (FIG. 6), which normally engage with the inner sides of the legs 4, 4a and will fix the coupling bolt in its position. For assembling, the links are pushed into each other until the legs of one link contact the ends of the legs of the other link (FIG. 5). In this position of the links the transversal hole 3a in the journal body 3 is located slightly behind the circular enlargement of the slot 5, and only upon rotation of the journal body 3 to the position shown in FIG. 5 the enlargement of the slot 5 and the hole 3a are related so to each other, that the coupling bolt 2 in an oblique direction can be inserted through the enlargement of the slot 5 and through the hole 3a into the slot 6 in the opposite leg. Then the journal body 3 is rotated until the coupling bolt extends at right angles to the longitudinal direction of the link. Now the coupling bolt has its shoulders 8 lying in contact with the inner sides of the legs and cannot rotate from this position, because the plates 7 engage in the slots 5, 6. Disjoining the chain is performed in the opposite order.

On account of the fact that the claim can be disposed only when the links are maximally shut together and only after a certain rotation of the journal body 3, it is prevented that in unfavourable positions the coupling bolt 2 can fall out of the chain when this has been taken out of operation and removed from the installation.

In FIG. 7 the reference number 9 indicates the angular side member of the frame, and 10 is a bottom plate intercommunicating and holding the two side members spaced from each other. The link chain is guided between the edges of the side pieces, and the containers (not shown) transported on the link chain are guided between the side flanges of the side members 9.

What I claim is:

1. A slidable link chain comprising:
   (a) a plurality of successively arranged chain links, each of said links having first and second leg members and connecting means for retaining said leg members in a plane in an opposed spaced relation, said connecting means including means defining a journal housing and apertures through said connecting means generally transversely of the longitudinal axis of said chain, said apertures being in communication with said housing, said first leg member defining a slot therethrough, generally transversely of the longitudinal axis of said chain, having an enlarged portion and said second leg member defining a slot therethrough opposite the slot in said first leg member, each of said links having its connecting means disposed between the legs of the adjacent link with the slots and apertures in aligned relation and, cooperative means on said links engaged to limit the relative movement of said connecting means inwardly of the adjacent link;
   (b) a plurality of journal members each rotatably received in the journal housing of a connecting means, each of said journal members defining a bore disposed in the plane of the leg members generally normal to the axis of the chain and in communication with the apertures of the connecting means, the journal bore being offset relative to the enlarged portion of said slot in said first leg member whereby alignment of said enlarged portion, the slot in the second leg member, and said journal bore is effected by rotation of said journal body to a position wherein the journal bore is obliquely disposed to the axis of the chain; and,
   (c) a plurality of coupling pins for releasably connecting adjacent chain links, each of said pins having opposed end portions of reduced thickness received in the slots of the leg members of one link and having an intermediate portion received in the bore of the journal member in the connecting means of the adjacent link, said intermediate portion having a diameter greater than the width of the slots in said leg members but less than the width of the enlarged portion of the slot of said first leg member whereby said journal bore may be rotated into alignment with said enlarged portion, said pin inserted through the enlarged portion, the bore in the journal member and the slot of the second leg member, and the journal member rotated to dispose one end portion of the pin in the slot portion of reduced width in the first leg member.

2. A slidable link chain as recited in claim 1 wherein the individual chain links are comprised of bow elements having a bent intermediate section comprising said connecting means said leg members extending outwardly from said section and being integral therewith.

3. A slidable link chain as recited in claim 2 wherein the spacing between said leg members increases outwardly from said section whereby said cooperative means on said links for limiting the inward relative movement of adjacent links is comprised of the end portion of the leg members of one of said links and a portion of the exterior surface of the leg members of the adjacent link, said end portion and said surface being engageable to limit relative movement.

References Cited

UNITED STATES PATENTS

| | | | |
|---|---|---|---|
| 891,189 | 6/1908 | Schmidt | 198—189 X |
| 1,694,746 | 12/1928 | Landahl | 74—254 |
| 2,753,982 | 7/1956 | Fredrikson | 198—189 |

ANDRES H. NIELSEN, *Primary Examiner.*

EDWARD A. SROKA, *Assistant Examiner.*